(No Model.)
A. M. JAYNE.
DRAIN FOR DISHES.
No. 463,056. Patented Nov. 10, 1891.
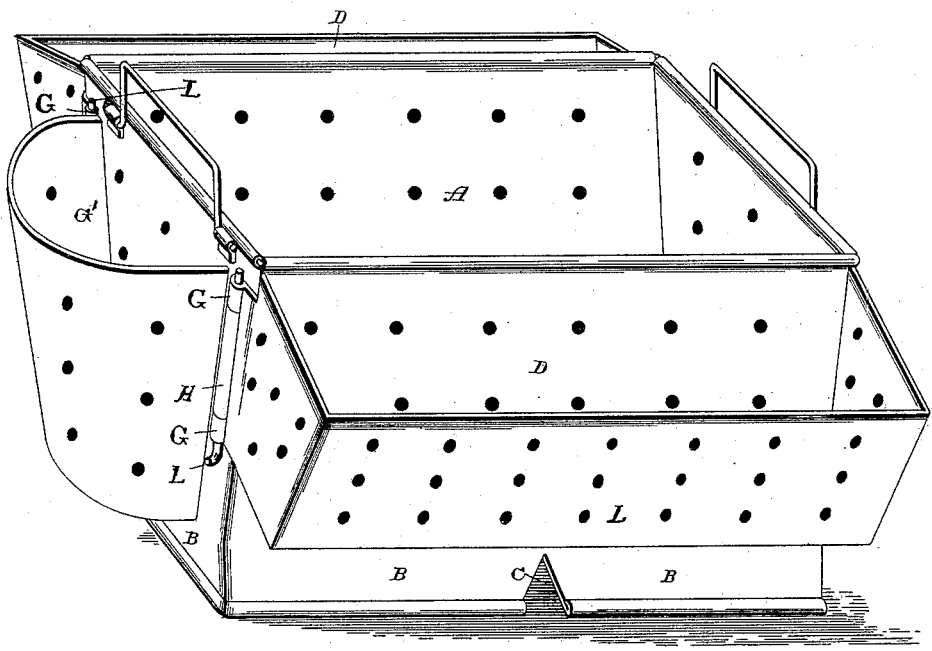
Witnesses:
Inventor.
Mrs. Alice M. Jayne
per
Lehmann & Pattison,
attys

UNITED STATES PATENT OFFICE.

ALICE M. JAYNE, OF BRADFORD, PENNSYLVANIA.

DRAIN FOR DISHES.

SPECIFICATION forming part of Letters Patent No. 463,056, dated November 10, 1891.

Application filed February 27, 1891. Serial No. 383,110. (No model.)

*To all whom it may concern:*

Be it known that I, ALICE M. JAYNE, of Bradford, in the county of McKean and State of Pennsylvania, have invented certain new and useful Improvements in Drains for Dishes; and I do hereby declare the following to be a full, clear, and exact description of the invention, such as will enable others skilled in the art to which it pertains to make and use it, reference being had to the accompanying drawing, which form part of this specification.

My invention relates to an improvement in drains for dishes; and it consists in a perforated vessel or holder of the construction hereinafter shown and described.

The object of my invention is to provide a perforated vessel or holder of the construction hereinafter specified, in which the dishes are to be placed either after they are washed to drain or in which they may be placed and then have hot water poured over them and then left to dry.

The accompanying drawing represents a perspective of a drain which embodies my invention.

A represents a vessel or holder of any desired shape or size and which is made preferably of perforated sheet metal, though I do not desire to limit myself in this respect, for it will be readily understood that any suitable apertured material may be substituted therefor. As the bottom and various sides and ends of this vessel are perforated in order to allow the water that drains off from the washed dishes to escape, a flange B is formed all around the bottom of the holder, so as to raise it above the support upon which it is placed, and through this flange are made openings C, through which the water freely escapes.

Secured to opposite sides of the vessel A are the two compartments D, which have outwardly-inclined sides L, so that the articles placed in them will incline away from the perforated sides of the vessel A. The compartments are not provided with an inner wall, but have the inner edges of their ends rest upon the outer sides of the vessel A, which latter form the inner walls of the said compartments. These compartments are preferably detachably connected to the vessel A by means of the eyes G, formed upon the inner edges of the ends of the compartments, the eyes H, formed upon the ends of the vessel A, and the removable pivotal rods I, which pass through the said eyes. By means of this construction the compartments can be quickly and readily detached from the vessel A for the purpose of allowing free access to the perforations made in the sides of the vessel A for cleaning them or for any other reason. As the compartments have open inner sides, free access is given to the inner sides of them for the purpose of cleaning when they are detached from the vessel A. In these compartments D it is intended to place the small articles of china, so that they are less liable to be broken than if placed in the vessel A together with the large and heavy articles, and these compartments are made shallower than the vessel A, so that they will not interfere with the outflow of water through the openings C and because it is not necessary to make them deep, since only small articles are to be placed in them.

At one end of the compartment or vessel A is secured a small compartment G', in which it is intended to place the knives, forks, and spoons. This compartment, like the compartments D, has an open inner side, but is preferably secured permanently to the vessel A.

After the dishes have been washed they are placed wet in the holder and then left to dry without the necessity for using a towel upon them. If it is not desired to wash the dishes by hand, the hot water is poured over them while the holder is placed in a dish-pan or sink until the dishes are washed clean. By lifting the holder out of the pan with all the dishes in it the dishes dry without any further trouble.

Having thus described my invention, I claim—

1. In a drain for dishes, the perforated body portion and detachable compartments secured at their ends to the body portion, the parts being combined substantially as shown and described.

2. A drain for dishes comprising a main apertured vessel, and small apertured compartments having open inner sides, the inner edges of the ends of the compartments having eyes secured to the ends of the main vessel and pivoted rods which pass through the said eyes, whereby the compartments are detachably connected to the vessel, substantially as shown, and for the purposes described.

In testimony whereof I affix my signature in presence of two witnesses.

ALICE M. JAYNE.

Witnesses:
M. H. RYLE,
H. H. NORTH.